(12) United States Patent
Hampton et al.

(10) Patent No.: US 12,208,720 B2
(45) Date of Patent: Jan. 28, 2025

(54) VIBROTACTILE SYSTEMS AND METHODS FOR AIRCRAFT SEATS

(71) Applicant: ROCKWELL COLLINS, INC., Cedar Rapids, IA (US)

(72) Inventors: John L. Hampton, Colorado Springs, CO (US); Glen Shaw, Colorado Springs, CO (US); Tyler Fahey, Woodland Park, CO (US); Donald Borchelt, Monument, CO (US); John R. Skola, Rowlett, TX (US); Robert Mishkin, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 255 days.

(21) Appl. No.: 17/838,676

(22) Filed: Jun. 13, 2022

(65) Prior Publication Data

US 2023/0398916 A1 Dec. 14, 2023

(51) Int. Cl.
| | | |
|---|---|---|
| *G08B 23/00* | (2006.01) | |
| *B60N 2/90* | (2018.01) | |
| *B64D 25/10* | (2006.01) | |
| *G08B 6/00* | (2006.01) | |

(52) U.S. Cl.
CPC .............. *B60N 2/90* (2018.02); *B64D 25/10* (2013.01); *B60N 2002/981* (2018.02); *G08B 6/00* (2013.01)

(58) Field of Classification Search
CPC .... B60N 2/90; B60N 2002/981; B64D 25/10; B64D 11/0616; B64D 11/0689; B64D 25/00; G08B 6/00
See application file for complete search history.

(56) References Cited

U.S. PATENT DOCUMENTS

| | | | |
|---|---|---|---|
| 3,902,687 A * | 9/1975 | Hightower | B64D 45/00 340/407.1 |
| 6,744,370 B1 | 6/2004 | Sleichter, III et al. | |
| 7,619,505 B2 | 11/2009 | Kim | |
| 8,339,285 B2 | 12/2012 | Boren et al. | |
| 8,730,065 B2 * | 5/2014 | Herman | G08B 6/00 340/407.1 |
| 10,399,492 B1 | 9/2019 | Paraskevas et al. | |
| 2005/0073439 A1 | 4/2005 | Perricone | |
| 2005/0267649 A1 | 12/2005 | Lee | |
| 2006/0071817 A1* | 4/2006 | Greene | B64C 27/57 340/965 |
| 2007/0109104 A1* | 5/2007 | Altan | B60Q 9/008 340/407.1 |
| 2020/0334923 A1* | 10/2020 | Yamamoto | B60Q 9/00 |
| 2022/0127008 A1 | 4/2022 | Venkatesha et al. | |

OTHER PUBLICATIONS

European Patent Office, European Search Report dated Oct. 16, 2023 in Application No. 23178751.6.

* cited by examiner

*Primary Examiner* — Toan N Pham
(74) *Attorney, Agent, or Firm* — SNELL & WILMER L.L.P.

(57) ABSTRACT

A vibrotactile system for an aircraft may comprise a plurality of tactors and a tactor driver operably coupled to the plurality of tactors. The tactor driver may be configured to determine a vibration sequence for the plurality of tactors in response to a signal received from an aircraft controller, and to send vibration commands corresponding to the vibration sequence to the plurality of tactors.

15 Claims, 5 Drawing Sheets

VIBROTACTILE SYSTEMS AND METHODS FOR AIRCRAFT SEATS

FIELD

The present disclosure relates to aircraft seats, more particularly, to vibrotactile systems for aircraft seats and methods for operating vibrotactile systems for aircraft seats.

BACKGROUND

Aircraft typically include means for visually and auditorily communicating information and/or warnings to the aircrew. For example, the information may be conveyed to the aircrew via display monitors, indicators lights, head-up displays, helmet mounted displays, speakers, etc. During operations, aircrew can become overwhelmed with visual and auditory information and may find it difficult to focus. Additionally, for visual communication the aircrew needs to be looking at the display to receive the information. In this regard, aircrew may not immediately see the information if he/she is looking externally or at other cockpit systems.

SUMMARY

In accordance with various embodiments, a vibrotactile system for an aircraft is disclosed, comprising a plurality of tactors, and a tactor driver operably coupled to the plurality of tactors and configured to send vibrations commands to the plurality of tactors in response to a signal received from an aircraft controller.

In various embodiments, the vibrotactile system further comprises a seat cushion, wherein the plurality of tactors includes a plurality of left seat tactors located in the seat cushion and a plurality of right seat tactors located in the seat cushion, the plurality of left seat tactors being located between a midplane of the seat cushion and a left side of the seat cushion, and the plurality of right seat tactors being located between the midplane of the seat cushion and a right side of the seat cushion.

In various embodiments, the vibrotactile system further comprises a seatback cushion, wherein the plurality of tactors further includes a plurality of left seatback tactors located in the seatback cushion and a plurality of right seatback tactors located in the seatback cushion, the plurality of left seatback tactors being located between a midplane of the seatback cushion and a left side of the seatback cushion, and the plurality of right seatback tactors being located between the midplane of the seatback cushion and a right side of the seatback cushion.

In various embodiments, the vibrotactile system further comprises a first tangible, non-transitory memory configured to communicate with the tactor driver, the first tangible, non-transitory memory having instructions stored thereon that, in response to execution by the tactor driver, cause the tactor driver to perform operations comprising receiving, by the tactor driver, the signal from the aircraft controller, determining, by the tactor driver, a vibration sequence for the plurality of tactors based on the signal received from the aircraft controller, and outputting, by the tactor driver, vibrate commands corresponding to the vibration sequence to at least one of the plurality of left seat tactors, the plurality of right seat tactors, the plurality of left seatback tactors, and the plurality of right seatback tactors.

In various embodiments, the vibration sequence and the vibrate commands are configured to cause each of the plurality of left seat tactors, the plurality of right seat tactors, the plurality of left seatback tactors, and the plurality of right seatback tactors to vibrate simultaneously.

In various embodiments, the vibration sequence and the vibrate commands are configured to cause at least one of the plurality of left seat tactors or the plurality of right seat tactors to vibrate sequentially such that a first tactor of the at least one of the plurality of left seat tactors or the plurality of right seat tactors vibrates first and a second tactor of the at least one of the plurality of left seat tactors or the plurality of right seat tactors vibrates last, the first tactor being located proximate a first end of the seat cushion and the second tactor being located proximate a second end of the seat cushion opposite the first end.

In various embodiments, the vibrotactile system further comprises the aircraft controller, and a second tangible, non-transitory memory configured to communicate with the aircraft controller, the second tangible, non-transitory memory having instructions stored thereon that, in response to execution by the aircraft controller, cause the aircraft controller to perform operations. The operations comprise receiving, by the aircraft controller, flight and aircraft data, determining, by the aircraft controller, the signal to send to the tactor driver based on the flight and aircraft data, and outputting, by the aircraft controller, the signal to the tactor driver.

In various embodiments, the flight and aircraft data is received from at least one of an avionic system, a sensor, or a landing gear system.

In various embodiments, the flight and aircraft data is received from a seat occupant monitoring system.

In accordance with various embodiments, a method for operating a vibrotactile system for an aircraft is disclosed. The method comprises receiving, by a tactor driver, a signal from an aircraft controller, determining, by the tactor driver, a vibration sequence for a plurality of tactors based on the signal received from the aircraft controller, and outputting, by the tactor driver, vibrate commands corresponding to the vibration sequence to the plurality of tactors.

In various embodiments, the method further comprises receiving, by the aircraft controller, flight and aircraft data, determining, by the aircraft controller, the signal to send to the tactor driver based on the flight and aircraft data, and outputting, by the aircraft controller, the signal to the tactor driver.

In various embodiments, the flight and aircraft data is received from at least one of an avionic system, a sensor, a landing gear system, or a seat occupant monitoring system.

In various embodiments, the flight and aircraft data is indicative of a location of the aircraft relative to a boundary, and wherein determining, by the aircraft controller, the signal to send to the tactor driver comprises comparing, by the aircraft controller, a distance between the aircraft and the boundary to a threshold distance, and wherein the aircraft controller is configured to send the signal to the tactor driver in response to the distance being less than the threshold distance.

In various embodiments, the signal sent by the aircraft controller and the vibrate commands sent by the tactor driver are configured to cause the plurality of tactors to vibrate faster as the distance between the aircraft and the boundary decreases.

In various embodiments, the flight and aircraft data is indicative of a foreign object approaching the aircraft, and wherein the vibration sequence is configured to convey a direction from which the foreign object is approaching the aircraft.

In various embodiments, the plurality of tactors includes a plurality of left seatback tactors located in a seatback cushion and a plurality of right seatback tactors located in the seatback cushion, the plurality of left seatback tactors being located between a midplane of the seatback cushion and a left side of the seatback cushion, and the plurality of right seatback tactors being located between the midplane of the seatback cushion and a right side of the seatback cushion.

In various embodiments, the plurality of tactors further includes a plurality of left seat tactors located in a seat cushion and a plurality of right seat tactors located in the seat cushion, the plurality of left seat tactors being located between a midplane of the seat cushion and a left side of the seat cushion, and the plurality of right seat tactors being located between the midplane of the seat cushion and a right side of the seat cushion.

In various embodiments, the vibration sequence and the vibrate commands are configured to cause at least one of the plurality of left seat tactors or the plurality of right seat tactors to vibrate sequentially such that a first tactor of the at least one of the plurality of left seat tactors or the plurality of right seat tactors vibrates first and a second tactor of the at least one of the plurality of left seat tactors or the plurality of right seat tactors vibrates last, the first tactor being located proximate a first end of the seat cushion and the second tactor being located proximate a second end of the seat cushion opposite the first end.

In accordance with various embodiments, an ejection seat is disclosed. The ejection seat comprises a seatback including a seatback cushion, a seat bucket coupled to the seatback and including a seat cushion, a plurality of seatback tactors located in the seatback cushion, a plurality of seat tactors located in the seat cushion, and a tactor driver operably coupled to the plurality of seatback tactors and the plurality of seat tactors, the tactor driver being configured to send vibrations commands to the plurality of seatback tactors and the plurality of seat tactors.

In various embodiments, the tactor driver is configured to receive a signal from an aircraft controller and to determine a vibration sequence based on the signal received from the aircraft controller.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
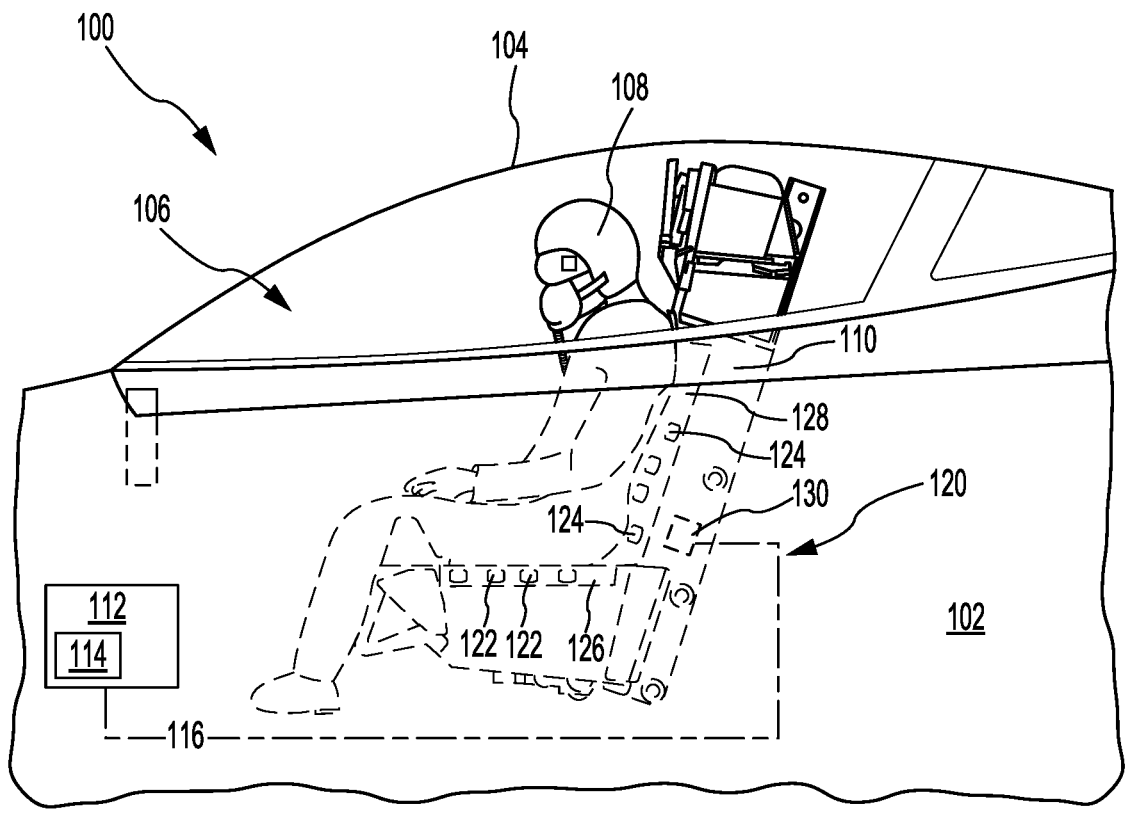
FIG. 1 illustrates an occupant seated on an ejection seat in a cockpit of an aircraft, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Disclosed herein is a vibrotactile system for alerting and/or conveying information to an aircraft crewmember (e.g., a pilot or copilot). In various embodiments, the vibrotactile system may be installed on an ejection seat. The vibrotactile system includes tactors, which may be located in a seat cushion and/or in a seatback cushion of the ejection seat. In accordance with various embodiments, the tactors may be energized by a tactor driver of the vibrotactile system. The tactor driver is in communication with an aircraft controller and is configured to receive signals from the aircraft controller. In accordance with various embodiments, the tactor driver is configured to energize (e.g., send vibrate commands to) the tactors in response to signals received from the aircraft controller. In accordance with various embodiments, the tactors may be energized individually, in groups, and/or collectively at varying frequencies, in varying order(s)/sequence(s), and/or at varying intervals (e.g., durations of time) depending on the signals output by the aircraft controller. Vibration of the tactors may alert the crewmember (i.e., occupant of the ejection seat) to an impending danger or other situation of which seat occupant should be made aware. The location, strength, sequence, and/or duration of the vibrations may convey information to the seat occupant and/or may direct the attention of the seat occupant in a particular direction. In this regard, the vibrotactile system, as disclosed here, may provide increased mission capability and increased safety as compared to standard visual and/or auditory alerts.

Referring now to FIG. 1, an aircraft 100 is illustrated. In various embodiments, the aircraft 100 includes a fuselage 102 and a canopy 104 enclosing an internal cockpit 106 in which an occupant 108 (e.g., a pilot) is positioned while operating the aircraft 100. An ejection seat 110 is disposed within the cockpit 106. Ejection seat 110 is configured to accommodate the occupant 108 during operation of the aircraft 100 as well as during an ejection sequence, which may be initiated in response to an emergency, a malfunction of aircraft 100, or any other ejection event.

In accordance with various embodiments, an aircraft controller 112 is installed in aircraft 100. Aircraft controller 112 may comprise a network, computer-based system, and/or software components configured to provide an access point to various systems, engines, and components of aircraft 100. In various embodiments, aircraft controller 112 may be implemented as and may include one or more processors and/or one or more tangible, non-transitory memories capable of implementing logic in response to execution by the aircraft controller 112. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Aircraft controller 112 may comprise a processor configured to implement various logical operations in response to execution of instructions, for example, instructions stored on a non-transitory, tangible, computer-readable memory 114 configured to communicate with aircraft controller 112. Memory 114 may store instructions usable by the logic device(s) to perform operations and make determinations related to the control of (e.g., the signals 116 sent to) a vibrotactile system 120.

In accordance with various embodiments, vibrotactile system 120 may be installed on ejection seat 110. Vibrotactile system 120 includes seat tactors 122 located in a seat cushion 126 and/or seat tactors 124 located in a seatback cushion 128 of ejection seat 110. In accordance with various embodiments, the seat tactors 122 and seatback tactors 124 (collectively referred to as tactors 122, 124) may be energized by a tactor driver 130 of vibrotactile system 120. The tactor driver 130 is in communication, via wired or wireless connection, with aircraft controller 112. In accordance with various embodiments, tactor driver 130 is configured to energize (e.g., send vibrate commands to) tactors 122, 124 in response to signals 116 received from aircraft controller 112.

In accordance with various embodiments, the tactors 122, 124 may energized individually, in groups, and/or collectively at varying frequencies, in varying order(s)/sequence(s), and/or at varying intervals (e.g., durations of time). In this regard, tactor driver 130 is configured to determine which tactors 122, 124 to energize based on the signal(s) 116 received from aircraft controller 112. Vibration of tactors 122, 124 may be configured to alert occupant 108 of an impending danger or other situation of which the occupant 108 should be made aware. The location, strength, sequence, and/or duration of the vibrations can be configured to convey information to occupant 108 and/or to direct the attention of the occupant 108 in a particular direction.

While vibrotactile system 120 is described with reference to an ejection seat 110, it is contemplated and understood that vibrotactile system 120 may be used with other types of crewmember seats, including for commercial aircraft. For example, vibrotactile system 120 may be installed on crewmember seats which do not eject from an aircraft (e.g., on pilot or copilot seats in commercial and/or private aircraft and/or on rotary or fixed wing aircraft). In various embodiments, tactors, similar to tactors 122, 124, may be installed in a flight suit worn by occupant 108. In various embodiments, one or more of tactors 122 or tactors 124 may be located at the midplane 148 or midplane 158, respectively.

Figure 2:
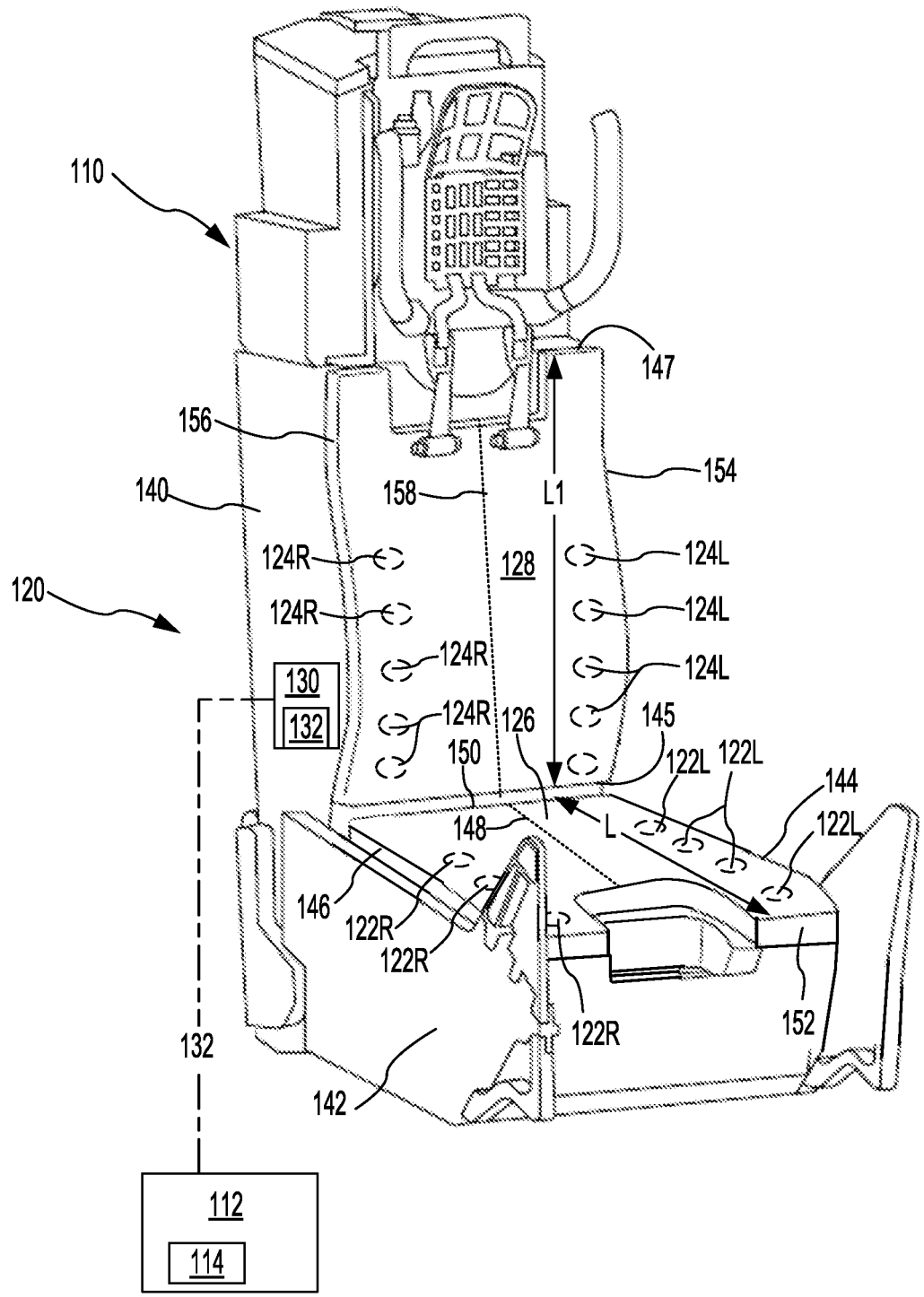
FIG. 2 illustrates an ejection seat including a vibrotactile system, in accordance with various embodiments.

With reference to FIG. 2, additional details of ejection seat 110 and vibrotactile system 120 are illustrated. In accordance with various embodiments, ejection seat 110 includes a seatback 140 and a seat bucket 142. Seat cushion 126 may be located over and/or on seat bucket 142. Seatback cushion 128 may be located over and/or on seatback 140. Seat tactors 122 may include a plurality of first (or left) seat tactors 122L located proximate a left side 144 of seat cushion 126, and a plurality of second (or right) seat tactors 122R located proximate a right side 146 of seat cushion 126. Left seat tactors 122L may be located between a midplane 148 of seat cushion 126 and left side 144 of seat cushion 126. Midplane 148 is an imaginary plane/line located halfway between left side 144 of seat cushion 126 and right side 146 of seat cushion 126 and extending from a backside 150 of seat cushion 126 to a frontside 152 of seat cushion 126. The backside 150 of seat cushion 126 is located proximate seatback 140. The frontside 152 of seat cushion 126 is opposite the backside 150 of the seat cushion 126 and seatback 140. Stated differently, the frontside 152 of the seat cushion 126 is distal to seatback 140. In various embodiments, left seat tactors 122L may be located halfway between the midplane 148 of seat cushion 126 and the left side 144 of seat cushion 126. In various embodiments, left seat tactors 122L may be located closer to the left side 144 of seat cushion 126 than to the midplane 148 of seat cushion 126. In various embodiments, right seat tactors 122R may be located halfway between the midplane 148 of seat cushion 126 and the right side 146 of seat cushion 126. In various embodiments, right seat tactors 122R may be located closer to the right side 146 of seat cushion 126 than to the midplane 148 of seat cushion 126.

Left seat tactors 122L may be arranged in a series (e.g., in a row) along left side 144 of seat cushion 126. Right seat tactors 122R may be arranged in a series (e.g., in a row) along right side 146 of seat cushion 126. In various embodiments, the left seat tactor 122L and the right seat tactor 122R closest to seatback 140 may be located at least 15%, at least 25%, and/or at least 33% of a length L of seat cushion 126 away from backside 150. Length L of seat cushion 126 may be measured between backside 150 of seat cushion 126 and the point on frontside 152 of seat cushion 126 that is farthest from backside 150. Stated differently, the left seat tactors 122L and the right seat tactors 122R may be located along 85%, 75%, and/or 67% of the length L of seat cushion 126, such that the area proximate backside 150 and seatback 140 is devoid of left seat tactors 122L and right seat tactors 122R.

Locating left seat tactors 122L and right seat tactors 122R proximate the left side 144 and the right side 146, respectively, of seat cushion 126 and away from backside 150 tends to increase occupant safety during ejection, as left seat tactors 122L and right seat tactors 122R are outboard of the spine, gluteal tuberosity, and pelvis bones, thereby reducing a likelihood that left seat tactors 122L and/or right seat tactors 122R will increase spinal loading during ejection. In this regard, the area proximate midplane 148, and in particular the area proximate midplane 148 and backside 150 of seat cushion 126 may be devoid of seat tactors 122.

Seatback tactors 124 may include a plurality of first (or left) seatback tactors 124L located proximate a left side 154 of seatback cushion 128, and a plurality of second (or right) seatback tactors 124R located proximate a right side 156 of seatback cushion 128. Left seatback tactors 124L may be located between a midplane 158 of seatback cushion 128 and left side 154 of seatback cushion 128. Midplane 158 is an imaginary plane/line located halfway between left side 154 of seatback cushion 128 and right side 156 of seatback cushion 128 and extending from a lower end 145 of seatback cushion 128 to an upper end 147 of seatback cushion 128. The lower end 145 of seatback cushion 128 is located proximate seat bucket 142. The upper end 147 of seatback cushion 128 is opposite the lower end 145 of the seatback cushion 128 and seat bucket 142. Stated differently, the upper end 147 of the seatback cushion 128 is distal to seat bucket 142. In various embodiments, left seatback tactors 124L may be located halfway between the midplane 158 of seatback cushion 128 and the left side 154 of seatback cushion 128. In various embodiments, left seatback tactors 124L may be located closer to the left side 154 of seatback cushion 128 than to the midplane 158 of seatback cushion 128. In various embodiments, right seatback tactors 124R may be located halfway between the midplane 158 of seatback cushion 128 and the right side 156 of seatback cushion 128. In various embodiments, right seatback tactors 124R may be located closer to the right side 156 of seatback cushion 128 than to the midplane 158 of seatback cushion 128.

Left seatback tactors 124L may be arranged in a series (e.g., in a row) along left side 154 of seatback cushion 128. Right seatback tactors 124R may be arranged in a series (e.g., in a row) along right side 156 of seatback cushion 128. In various embodiments, the left seatback tactor 124L and the right seatback tactor 124R that are closest to upper end 147 may be located at least 15%, at least 25%, at least 33%, or at least 50% of a length L1 of seatback cushion 128 away from upper end 147. Length L1 may be measured between lower end 145 and upper end 147. Stated differently, the left seatback tactors 124L and the right seatback tactors 124R may be located along 85%, 75%, 67%, or 50% of the length L1 of seatback cushion 128, such that the area proximate upper end 147 of seatback cushion 128 (e.g., the upper 15%, upper 25%, upper third and/or upper half of seatback cushion 128) is devoid of left seatback tactors 124L and right seatback tactors 124R.

Locating left seatback tactors 124L and right seatback tactors 124R only in the lower 85%, the lower 75%, the lower two thirds, or the lower half of seatback cushion 128 tends to increase the probability that the seat occupant's back will be in contact with, or in close proximity to, the portion of the seatback cushion 128 that includes the seatback tactors 124. For example, should the seat occupant be leaning forward and/or have his/her shoulders spaced apart from seatback cushion 128, the lower portion of the occupant's back will likely still be in contact with seatback cushion 128, or will, at least, be located close enough to seatback cushion 128 to feel the vibrations of the seatback tactors 124.

Figure 3:
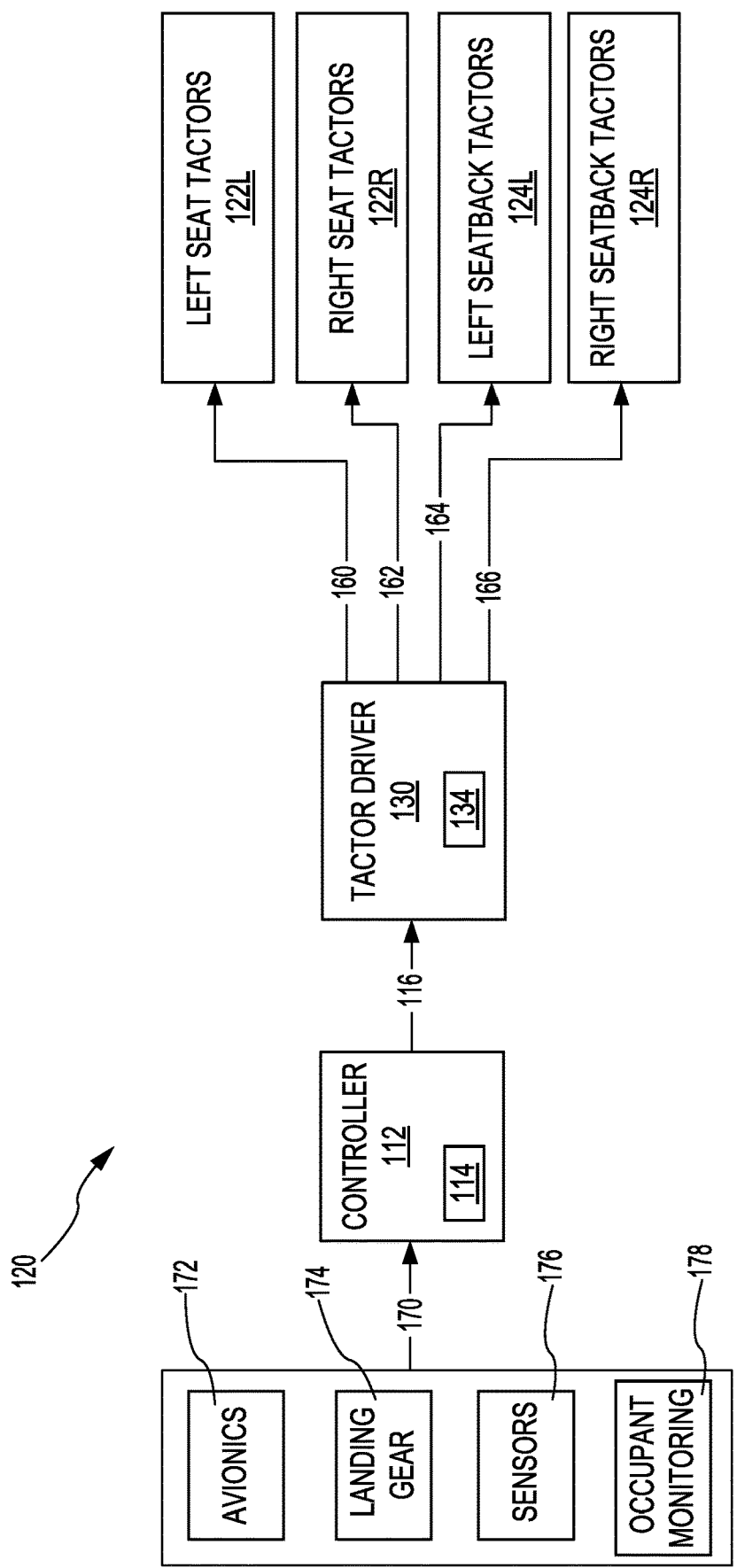
FIG. 3 illustrates a schematic of a vibrotactile system, in accordance with various embodiments.

FIG. 3 shows an exemplary schematic of vibrotactile system 120. With combined reference to FIG. 2 and FIG. 3, in accordance with various embodiments, tactor driver 130 is configured to send vibrate commands 160 (e.g., electrical signals) to left seat tactors 122L, vibrate commands 162 to right seat tactors 122R, vibrate commands 164 to left seatback tactors 124L, and vibrate commands 166 to right seatback tactors 124R. Left seat tactors 122L vibrate in response to receiving vibrate commands 160. Right seat tactors 122R vibrate in response to receiving vibrate commands 162. Left seatback tactors 124L vibrate in response to receiving vibrate commands 164. Right seatback tactors 124R vibrate in response to receiving vibrate commands 166. Tactor driver 130 is in communication, via wired or wireless connection, with aircraft controller 112. In accordance with various embodiments, tactor driver 130 is configured to determine which tactors 122L, 122R, 124L, 124R to energize based on the signal(s) 116 received from aircraft controller 112. Stated differently, tactor driver 130 is configured to determine a vibration sequence for tactors 122L, 122R, 124L, 124R based on signal(s) 116 and which vibrate commands 160, 162, 164, 166 to send to achieve the vibration sequence. While referred to as a "sequence," it is contemplated and is understood that "a vibration sequence" as disclosed herein includes exciting the tactors 122L, 122R, 124L, and/or 124R both sequentially and simultaneously, depending on the signal 116.

In various embodiments, tactor driver 130 may be implemented as and may include one or more processors and/or one or more tangible, non-transitory memories capable of implementing logic in response to execution by the tactor driver 130. Each processor can be a general purpose processor, a DSP, an ASIC, a FPGA or other programable logic device, discrete gate or transistor logic, discrete hardware components, or any combination thereof. Tactor driver 130 may comprise a processor configured to implement various logical operations in response to execution of instructions, for example, instructions stored on a non-transitory, tangible, computer-readable memory 134 configured to communicate with tactor driver 130. Memory 134 may store instructions usable by the logic device(s) to perform operations and to make determinations related to the control and/or vibration sequences for tactors 122L, 122R, 124L, 124R.

In accordance with various embodiments, vibrate commands 160 may be configured to cause left seat tactors 122L to vibrate sequentially or to vibrate simultaneously. For example, tactor driver 130 may determine, based on a first signal 116, to employ a vibration sequence where the left seat tactors 122L vibrate sequentially. Tactor driver 130 may then send vibrate commands 160 sequentially to the left seat tactors 122L, such that the left seat tactor 122L closest to frontside 152 of seat cushion 126 vibrates first and the left seat tactor 122L closest to backside 150 vibrates last, or vice versa. In response to a different (e.g., a second) signal 116, tactor driver 130 may determine to employ a vibration sequence where the left seat tactors 122L vibrate simultaneously. Tactor driver 130 may then send vibrate command(s) 160 configured to cause all the left seat tactors 122L, or a combination of the left seat tactors 122L, to vibrate simultaneously. In various embodiments, vibrate command(s) 160 may be configured to cause left seat tactors 122L to asynchronously and/or sequentially vibrate.

In accordance with various embodiments, vibrate commands 162 may be configured to cause right seat tactors 122R to vibrate sequentially or to vibrate simultaneously. For example, tactor driver 130 may determine, based on a signal 116, to employ a vibration sequence where the right seat tactors 122R vibrate sequentially. Tactor driver 130 may then send vibrate commands 162 sequentially to the right seat tactors 122R, such that the right seat tactor 122R closest to backside 150 vibrates first and the right seat tactor 122R closest to frontside 152 vibrates last, or vice versa. In response to a different (e.g., second) signal 116, tactor driver 130 may determine to employ a vibration sequence where the right seat tactors 122R vibrate simultaneously. Tactor driver 130 may then send a vibrate command 162 configured to cause all the right seat tactors 122R, or a combination of the right seat tactors 122R, to vibrate simultaneously. In response to another (e.g., third) signal 116, tactor driver 130 may determine a vibration sequence and may send vibrate command(s) 160 and vibrate command(s) 162 configured to cause the left seat tactors 122L and the right seat tactors 122R to vibrate simultaneously.

In accordance with various embodiments, vibrate commands 164 may be configured to cause left seatback tactors 124L to vibrate sequentially or to vibrate simultaneously. For example, tactor driver 130 may determine, based on a signal 116, to employ a vibration sequence where the left seatback tactors 124L vibrate sequentially. Tactor driver 130 may then send vibrate commands 164 sequentially to the left seatback tactors 124L, such that the left seatback tactor 124L closest to upper end 147 vibrates first and the left seatback tactor 124L closest to lower end 145 vibrates last, or vice versa. In response to a different (e.g., second) signal 116, tactor driver 130 may determine to employ a vibration sequence where the left seatback tactors 124L vibrate simultaneously. Tactor driver 130 may then send a vibrate command 164 configured to cause all the left seatback tactors 124L, or a combination of the left seatback tactors 124L, to vibrate simultaneously. In response to a different (e.g., third) signal 116, tactor driver 130 may determine a vibration sequence and may send vibrate command(s) 160 and vibrate command(s) 164 configured to cause the left seat tactors 122L and the left seatback tactors 124L to vibrate simultaneously.

In accordance with various embodiments, vibrate commands 166 may be configured to cause right seatback tactors 124R to vibrate sequentially or to vibrate simultaneously. For example, tactor driver 130 may determine, based on a signal 116, to employ a vibration sequence where the right seatback tactors 124R vibrate sequentially. Tactor driver 130 may then send vibrate commands 166 sequentially to the right seatback tactors 124R, such that the right seatback tactor 124R closest to upper end 147 vibrates first and the right seatback tactor 124R closest to lower end 145 vibrates last, or vice versa. In response to a different (e.g., second) signal 116, tactor driver 130 may determine to employ a vibration sequence where the right seatback tactors 124R vibrate simultaneously. Tactor driver 130 may then send a vibrate command 166 configured to cause all the right seatback tactors 124R, or a combination of the right seatback tactors 124R, to vibrate simultaneously. In response to a different (e.g., third) signal 116, tactor driver 130 may determine a vibration sequence and may send vibrate command(s) 162 and vibrate command(s) 166 configured to cause the right seat tactors 122R and the right seatback tactors 124R to vibrate simultaneously. In response to a different (e.g., fourth) signal 116, tactor driver 130 may determine a vibration sequence and may send vibrate command(s) 164 and vibrate command(s) 166 configured to cause the left seatback tactors 124L and the right seatback tactors 124R to vibrate simultaneously. In response to a different (e.g., fifth) signal 116, tactor driver 130 may determine a vibration sequence and may send vibrate command(s) 160, vibrate command(s) 162, vibrate command(s) 164, and vibrate command(s) 166 configured to cause the left seat tactors 122L, the right seat tactors 122R, the left seatback tactors 124L, and the right seatback tactors 124R to vibrate simultaneously.

In accordance with various embodiments, aircraft controller 112 receives flight and aircraft data 170. Aircraft controller 112 determines and outputs signal(s) 116 based on flight and aircraft data 170. Flight and aircraft data 170 may include data from an avionics system 172. For example, flight and aircraft data 170 may include altitude, velocity, global positioning system (GPS), communications, navigation, display, mission, environment, or any other avionics system information. Flight and aircraft data 170 may also include data from the aircraft landing gear system 174. For example, flight and aircraft data 170 may include information related to the position and/or status of one or more of the aircraft landing gears and/or information about the landing gear wheels and brake assemblies. Flight and aircraft data 170 may also include data from one or more sensor(s) 176. For example, flight and aircraft data 170 may include information related the engines. Stated differently, sensor(s) 176 may monitor and output information related to the aircraft engines. In various embodiments, sensor(s) 176 may be configured to detect foreign objects (e.g., object outside the aircraft) and their proximity to and/or trajectory toward the aircraft. In this regard, flight and aircraft data 170 may include foreign object data.

Flight and aircraft data 170 may also include data from a seat occupant monitoring system 178. Seat occupant monitoring system 178 may be configured to monitor a health and/or alertness of occupant 108 (FIG. 1). For example, seat occupant monitoring system 178 may include non-invasive, light weight, bio sensors configured to monitor various physiological conditions of occupant 108 (FIG. 1). In various embodiments, seat occupant monitoring system 178 may include a wearable (e.g., a smart watch, chests strap, skull cap with sensors, etc.) configured to be worn by occupant 108 and to detect a blood pressure, heart rate, temperature, oxygen saturation, electrical activity in the brain, and/or other physiological condition of the occupant 108. In various embodiments, seat occupant monitoring system 178 may include eye movement and/or facial recognition sensors (e.g., camera(s), light detector(s), infrared detector(s), or any other sensor capable of detecting image data corresponding to the occupant 108) designed to detect eye movement and/or image data corresponding to a biometric feature of the occupant 108. The eye movement and/or facial recognition sensors may be located on canopy 104 (FIG. 1), on a helmet visor worn by occupant 108, or at any other location where the eyes and face of occupant 108 may be monitored. Aircraft controller 112 may perform signal conditioning and run various algorithms to detect a state of consciousness of occupant 108. Aircraft controller 112 may make determinations regarding the state of consciousness of occupant 108 based on one or more of an electroencephalogram (EEG), a blood pressure (BP), temperature, oxygen content, eye movement, and/or an ECG of occupant 108.

In accordance with various embodiments, in response to receiving flight and aircraft data 170, aircraft controller 112 outputs signal 116. For example, in response to receiving flight and aircraft data 170 indicating that occupant 108 is asleep, unconscious, or otherwise unalert, aircraft controller 112 may send a "wake-up" signal 116 to tactor driver 130. In response to receiving, the wake-up signal 116, tactor driver 130 may determine a vibrate sequence and output vibrate command(s) 160, vibrate command(s) 162, vibrate command(s) 164, and vibrate command(s) 166, thereby causing tactors 122, 124 to vibrate. In various embodiments, aircraft controller 112 may be configured to determine, based on flight and aircraft data 170, whether occupant 108 responds to the excited tactors. If the occupant 108 does not respond, aircraft controller 112 may send a second "wake-up" signal 116. The second wake-up signal 116 may be different from the first wake-up signal 116. For example, the second wake-up signal 116 may cause tactor driver 130 to determine a vibrate sequence and output vibrate commands 160, 162, 164, 166 configured to increase the length or strength of the tactor vibration, as compared to the vibrate commands 160, 162, 164, 166 associated with the first wake up signal 116.

In various embodiments, aircraft controller 112 output a direction signal 116. For example, in response to flight and aircraft data 170 indicative of an object approaching from the rear starboard side of the aircraft, aircraft controller 112 may output a direction signal 116 to tactor driver 130. In response to the direction signal 116, tactor driver 130 may determine a vibrate sequence and send vibrate commands 166 to one or more of the right seatback tactors 124R. In various embodiments, the direction signal 116 may be configured to draw the attention of occupant 108 (FIG. 1) to an alert (e.g., a light or message) on the cockpit display. For example, in response receiving flight and aircraft data 170 indicative of an engine fault condition, aircraft controller 112 may command an alert located on the cockpit display to display a warning and may send an alert direction signal 116 configured to cause the tactors to vibrate in a manner configured to draw the attention of occupant 108 in the direction of the alert. For example, in response to commanding an alert located on the left side of the cockpit display to output a warning, aircraft controller 112 may output an alert direction signal 116 to tactor driver 130. In response to receiving the alert direction signal 116, tactor driver 130 may determine a vibrate sequence and send vibrate commands 160 configured to cause left seat tactors 122L to vibrate sequentially, starting with the left seat tactor 122L closest to the backside 150 of the seat cushion 126 and ending with the left seat tactor 122L closest to the frontside 152 of the seat cushion 126. The order of the tactor vibrations is configured to cause the occupant 108 to look at the left side of the cockpit display (i.e., in the direction of the alert).

In various embodiments, vibrotactile system 120 may alert occupant 108 to danger. For example, flight and aircraft data 170 may be indicative of the location of the aircraft relative to an invisible and/or geographical boundary (e.g., a no-fly zone, a country's border, another aircraft's fly space, etc.). In response to the distance between the aircraft and the boundary becoming less than a threshold distance, aircraft controller 112 may send a boundary approaching signal 116. In response to receiving boundary approaching signal 116, tactor driver 130 may determine a vibrate sequence and send vibrate commands 160, 164 if the boundary is on the port side, or send vibrate commands 162, 166 if the boundary is on the starboard side. In various embodiments, as the aircraft gets closer to the boundary, the boundary approaching signal 116 and the vibrate commands may cause the tactors 122, 124 to vibrate faster. In this regard, a time between vibrations and the duration of the vibrations may decrease as the aircraft gets closer to the boundary, thereby indicating to the occupant 108 that the boundary is approaching.

Alerting occupant 108 using vibration tends to increase the probability that occupant 108 will be alerted to the danger or other anomaly, as a tired and/or distracted occupant 108 may not see a visual alert. For example, a tired pilot may not see an alert and/or read the gages informing him/her that he/she is approaching a landing too shallow. However, with vibrotactile system 120, flight and aircraft data 170 conveys to aircraft controller 112 that the aircraft is not in condition to make a safe landing (e.g., flight and aircraft data 170 may indicate the approach is too shallow, the speed is too great, one or more of the landing gear(s) is/are not in position, etc.). In response to the flight and aircraft data 170, aircraft controller 112 sends a fault signal 116 to tactor driver 130. In response to receiving the fault signal 116, tactor driver 130 determines a vibrate sequence and sends one or more of vibrate commands 160, 162, 164, 166, thereby causing one or more of tactors 122L, 122R, 124L, 124R to vibrate. The vibration of the tactors immediately conveys to the occupant 108 that there is an issue with his landing approach, allowing him to pull up and determine how to handle the issue.

It will be appreciated that the foregoing are some or many exemplary uses of vibrotactile system 120 and that multiple combinations of excited tactors and vibration sequences may be employed to alert the occupant 108 to any number of situations.

Figure 4A:
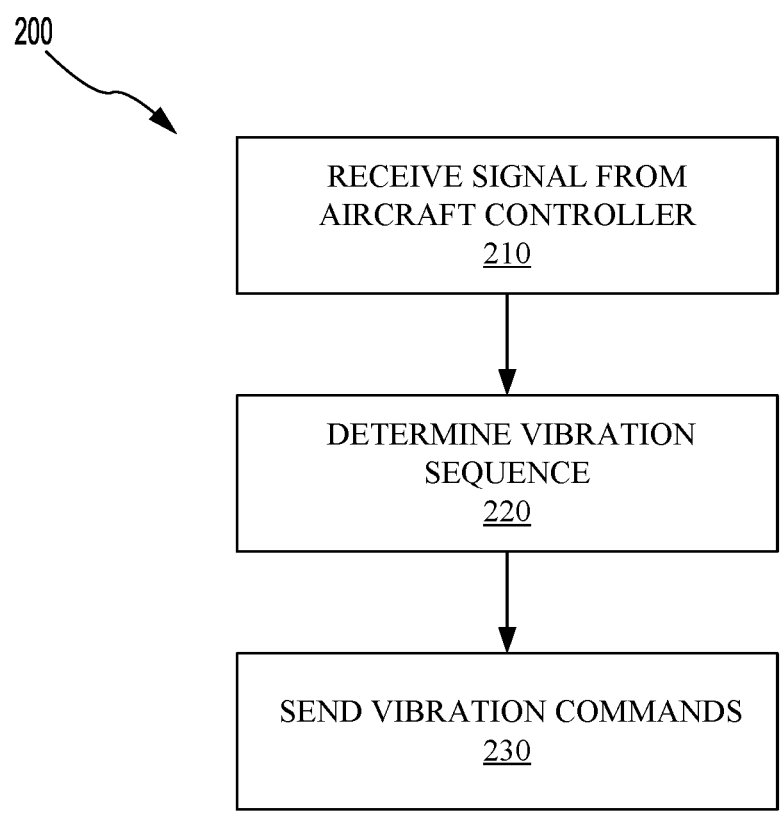
FIGS. 4A and 4B illustrate a flowchart for a method for operating a vibrotactile system, in accordance with various embodiments.

With reference to FIG. 4A, a method 200 for controlling a vibrotactile system for an aircraft is illustrated. In accordance with various embodiments, method 200 may include receiving, by a tactor driver, a signal from an aircraft controller (step 210), determining, by the tactor driver, a vibration sequence for a plurality of tactors based on the signal received from the aircraft controller (step 220), and outputting, by the tactor driver, vibrate commands corresponding to the vibration sequence to the plurality of tactors (step 230).

With combined reference to FIGS. 4A and 3, step 210 may include tactor driver 130 receiving signal 116 from aircraft controller 112. Step 220 may include tactor driver 130 determining a vibration sequence for tactors 122, 124 based on signal 116. Step 230 may include tactor driver 130 sending one or more of vibrate commands 160, 162, 164, 166 to one or more of left seat tactors 122L, right seat tactors 122R, left seatback tactors 124L, and right seatback tactors 124R, respectively. The one or more vibrate commands 160, 162, 164, 166 are configured to cause left seat tactors 122L, right seat tactors 122R, left seatback tactors 124L, and/or right seatback tactors 124R to vibrate in the determined vibration sequence.

Figure 4B:
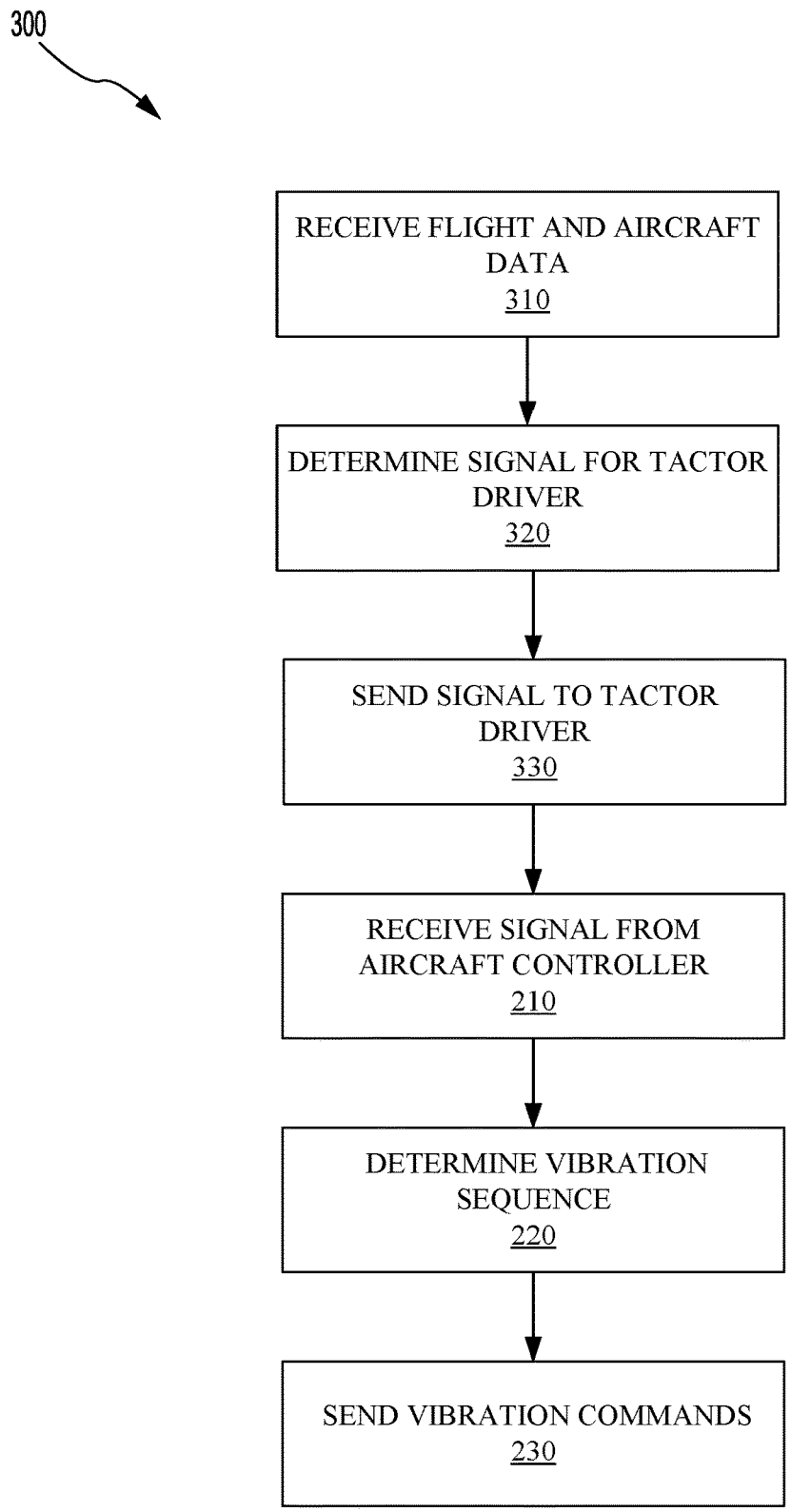

With reference to FIG. 4B, a method 300 for controlling a vibrotactile system for an aircraft is illustrated. Method 300 may be similar to method 200 (see FIG. 4A) except that method 300 further includes receiving, by the aircraft controller, flight and aircraft data (step 310), determining, by the aircraft controller, the signal to send to the tactor driver based on the flight and aircraft data (step 320), and outputting, by the aircraft controller, the signal to the tactor driver (step 330).

With combined reference to FIG. 4B and FIG. 3, in various embodiments, step 310 may include aircraft controller 112 receiving flight and aircraft data 170. Step 320 may include aircraft controller 112 determining the signal 116 to send to tactor driver 130 based on flight and aircraft data 170. Step 330 may include aircraft controller 112 outputting signal 116 to tactor driver 130.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vibrotactile system for an aircraft, comprising:
a seat cushion;
a seatback cushion;
a plurality of tactors including a plurality of left seat tactors located in the seat cushion, a plurality of right seat tactors located in the seat cushion, a plurality of left seatback tactors located in the seatback cushion, and a plurality of right seatback tactors located in the seatback cushion, the plurality of left seat tactors being located between a midplane of the seat cushion and a left side of the seat cushion, the plurality of right seat tactors being located between the midplane of the seat cushion and a right side of the seat cushion, the plurality of left seatback tactors being located between a midplane of the seatback cushion and a left side of the seatback cushion, and the plurality of right seatback tactors being located between the midplane of the seatback cushion and a right side of the seatback cushion;
a tactor driver operably coupled to the plurality of tactors and configured to send vibrations commands to the plurality of tactors in response to a signal received from an aircraft controller; and
a first tangible, non-transitory memory configured to communicate with the tactor driver, the first tangible, non-transitory memory having instructions stored thereon that, in response to execution by the tactor driver, cause the tactor driver to perform operations comprising:
receiving, by the tactor driver, the signal from the aircraft controller;
determining, by the tactor driver, a vibration sequence for the plurality of tactors based on the signal received from the aircraft controller; and
outputting, by the tactor driver, vibrate commands corresponding to the vibration sequence to at least one of the plurality of left seat tactors, the plurality of right seat tactors, the plurality of left seatback tactors, and the plurality of right seatback tactors;
wherein the vibration sequence and the vibrate commands are configured to cause at least one of the plurality of left seat tactors or the plurality of right seat tactors to vibrate sequentially such that a first tactor of the at least one of the plurality of left seat tactors or the plurality of right seat tactors vibrates first and a second tactor of the at least one of the plurality of left seat tactors or the plurality of right seat tactors vibrates last, the first tactor being located proximate a first end of the seat cushion and the second tactor being located proximate a second end of the seat cushion opposite the first end.

2. The vibrotactile system of claim 1, wherein the vibration sequence and the vibrate commands are configured to cause each of the plurality of left seat tactors, the plurality of right seat tactors, the plurality of left seatback tactors, and the plurality of right seatback tactors to vibrate simultaneously.

3. The vibrotactile system of claim 1, further comprising:
the aircraft controller; and
a second tangible, non-transitory memory configured to communicate with the aircraft controller, the second tangible, non-transitory memory having instructions stored thereon that, in response to execution by the aircraft controller, cause the aircraft controller to perform operations comprising:
receiving, by the aircraft controller, flight and aircraft data;
determining, by the aircraft controller, the signal to send to the tactor driver based on the flight and aircraft data; and
outputting, by the aircraft controller, the signal to the tactor driver.

4. The vibrotactile system of claim 3, wherein the flight and aircraft data is received from at least one of an avionic system, a sensor, or a landing gear system.

5. The vibrotactile system of claim 3, wherein the flight and aircraft data is received from a seat occupant monitoring system.

6. The vibrotactile system of claim 1, wherein the tactor driver is configured to receive a direction signal from the aircraft controller and, in response to receiving the direction signal, the tactor driver determines the vibration sequence and outputs the vibrate commands to cause the plurality of tactors to vibrate in a manner configured to draw attention of an occupant of the aircraft to a direction of an alert.

7. The vibrotactile system of claim 1, wherein:
the plurality of left seat tactors are located closer to the left side of the seat cushion than to the midplane of the seat cushion; and
the plurality of right seat tactors are located closer to the right side of the seat cushion than to the midplane of the seat cushion.

8. The vibrotactile system of claim 1, wherein:
the plurality of left seatback tactors are located closer to the left side of the seatback cushion than to the midplane of the seatback cushion; and
the plurality of right seatback tactors are located closer to the right side of the seatback cushion than to the midplane of the seatback cushion.

9. A method for operating a vibrotactile system for an aircraft, the method comprising:
receiving, by a tactor driver, a signal from an aircraft controller;
determining, by the tactor driver, a vibration sequence for a plurality of tactors based on the signal received from the aircraft controller; and
outputting, by the tactor driver, vibrate commands corresponding to the vibration sequence to at least one of a plurality of left seat tactors, a plurality of right seat tactors, a plurality of left seatback tactors, and a plurality of right seatback tactors;
wherein the vibration sequence and the vibrate commands are configured to cause at least one of the plurality of left seat tactors or the plurality of right seat tactors to vibrate sequentially such that a first tactor of the at least one of the plurality of left seat tactors or the plurality of right seat tactors vibrates first and a second tactor of the at least one of the plurality of left seat tactors or the plurality of right seat tactors vibrates last, the first tactor being located proximate a first end of a seat cushion and the second tactor being located proximate a second end of the seat cushion opposite the first end;
wherein the plurality of tactors includes the plurality of left seat tactors located in the seat cushion, the plurality of right seat tactors located in the seat cushion, a plurality of left seatback tactors located in a seatback cushion, and a plurality of right seatback tactors located in the seatback cushion, the plurality of left seat tactors being located between a midplane of the seat cushion and a left side of the seat cushion, the plurality of right seat tactors being located between the midplane of the seat cushion and a right side of the seat cushion, the plurality of left seatback tactors being located between a midplane of the seatback cushion and a left side of the seatback cushion, and the plurality of right seatback tactors being located between the midplane of the seatback cushion and a right side of the seatback cushion.

10. The method of claim 9, further comprising:
receiving, by the aircraft controller, flight and aircraft data;
determining, by the aircraft controller, the signal to send to the tactor driver based on the flight and aircraft data; and
outputting, by the aircraft controller, the signal to the tactor driver.

11. The method of claim 10, wherein the flight and aircraft data is received from at least one of an avionic system, a sensor, a landing gear system, or a seat occupant monitoring system.

12. The method of claim 11, wherein the flight and aircraft data is indicative of a location of the aircraft relative to a boundary, and wherein determining, by the aircraft controller, the signal to send to the tactor driver comprises comparing, by the aircraft controller, a distance between the aircraft and the boundary to a threshold distance, and wherein the aircraft controller is configured to send the signal to the tactor driver in response to the distance being less than the threshold distance.

13. The method of claim 12, wherein the signal sent by the aircraft controller and the vibrate commands sent by the tactor driver are configured to cause the plurality of tactors to vibrate faster as the distance between the aircraft and the boundary decreases.

14. The method of claim 11, wherein the flight and aircraft data is indicative of a foreign object approaching the aircraft, and wherein the vibration sequence is configured to convey a direction from which the foreign object is approaching the aircraft.

15. An ejection seat, comprising:
a seatback including a seatback cushion;
a seat bucket coupled to the seatback and including a seat cushion;
a plurality of seatback tactors located in the seatback cushion, the plurality of seatback tactors including a plurality of left seatback tactors and a plurality of right seatback tactors, the plurality of left seatback tactors being located between a midplane of the seatback cushion and a left side of the seatback cushion, and the plurality of right seatback tactors being located between the midplane of the seatback cushion and a right side of the seatback cushion;
a plurality of seat tactors located in the seat cushion, the plurality of seat tactors including a plurality of left seat tactors and a plurality of right seat tactors, the plurality of left seat tactors being located between a midplane of the seat cushion and a left side of the seat cushion, the plurality of right seat tactors being located between the midplane of the seat cushion and a right side of the seat cushion; and
a tactor driver operably coupled to the plurality of seatback tactors and the plurality of seat tactors, the tactor driver being configured to send vibrations commands to the plurality of seatback tactors and the plurality of seat tactors, wherein the tactor driver is configured to:
receive a signal from an aircraft controller;
determine a vibration sequence for the plurality of tactors based on the signal received from the aircraft controller; and
output vibrate commands corresponding to the vibration sequence to at least one of the plurality of left seat tactors, the plurality of right seat tactors, the plurality of left seatback tactors, and the plurality of right seatback tactors;
wherein the vibration sequence and the vibrate commands are configured to cause at least one of the plurality of left seat tactors or the plurality of right seat tactors to vibrate sequentially such that a first tactor of the at least one of the plurality of left seat tactors or the plurality of right seat tactors vibrates first and a second tactor of the at least one of the plurality of left seat tactors or the plurality of right seat tactors vibrates last, the first tactor being located proximate a first end of the seat cushion and the second tactor being located proximate a second end of the seat cushion opposite the first end.

* * * * *